US006325399B1

(12) United States Patent
DeMoss

(10) Patent No.: US 6,325,399 B1
(45) Date of Patent: Dec. 4, 2001

(54) SIDE LIFT WHEEL CHAIRS

(76) Inventor: David DeMoss, 307 N. Williams, Anamosa, IA (US) 52205

(*) Notice: Subject to any disclaimer, the term of this patent is extended or adjusted under 35 U.S.C. 154(b) by 0 days.

(21) Appl. No.: 09/659,413

(22) Filed: Sep. 11, 2000

(51) Int. Cl.[7] .............................................. B62M 1/14
(52) U.S. Cl. ................................... 280/250.1; 5/86.1
(58) Field of Search .......................... 280/250.1, 304.1, 280/65.1, 907; 5/81.1 R, 83.1, 87.1, 86.1, 81.1 HS

(56) References Cited

U.S. PATENT DOCUMENTS 4,278,387 7/1981 Seguela et al. .
4,354,791 10/1982 Antonellis .
4,477,117 10/1984 Higgs .
4,574,901 * 3/1986 Joyner ................................ 180/65.1
4,669,943 6/1987 Zamotin .
4,934,723 6/1990 Dysarz .
5,060,960 10/1991 Branscumb et al. .
5,096,008 3/1992 Mankowski .
5,209,322 5/1993 McMahon .
5,613,697 3/1997 Johnson .
5,619,762 4/1997 Mein .
5,669,620 * 9/1997 Robbins ........................... 280/250.1
5,729,842 * 3/1998 McCarthy .............................. 5/81.1
5,884,929 3/1999 Kincaid .

* cited by examiner

*Primary Examiner*—Kevin Hurley
(74) *Attorney, Agent, or Firm*—Douglas J. Stillwell

(57) ABSTRACT

A lift wheelchair having a slide assembly seat support mechanism is disclosed. An extension element or cylinder is used to force a seat-supporting slide assembly upwardly and outward from the wheelchair frame. Stabilizing means are employed to accommodate the shifting center of gravity of the wheelchair-occupant system, and arms on the seat may be pivoted to create a transfer-assisting bed-board or slide. One or more lift arms may be used to transfer the force from the extension element to the slide assembly and to provide load bearing support and seat stabilization for the wheelchair assembly.

20 Claims, 4 Drawing Sheets

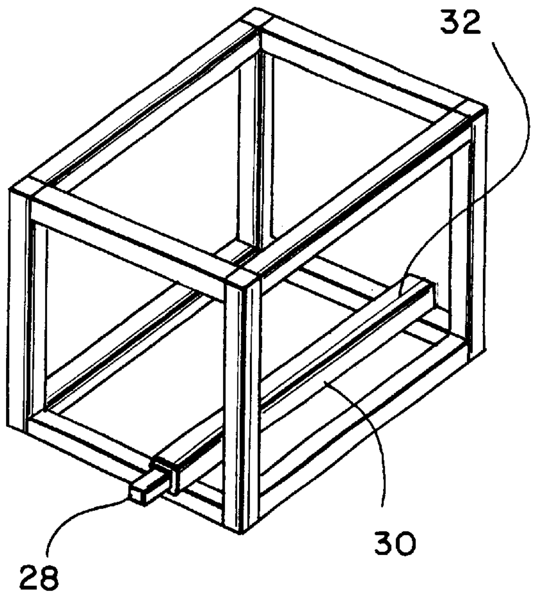
FIG. 6
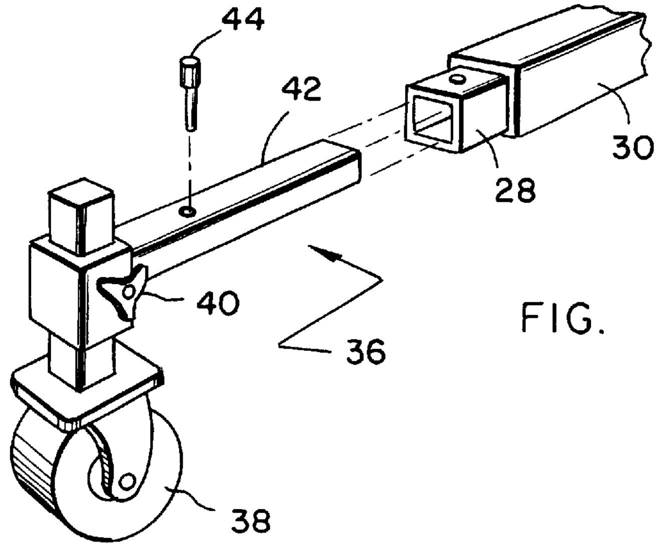
FIG. 7
FIG. 8
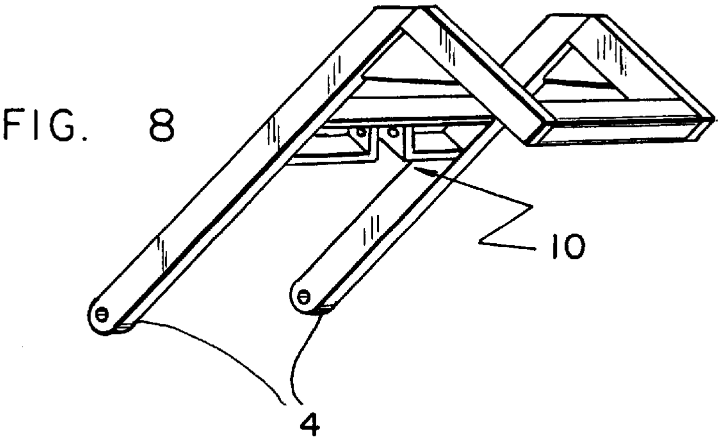

SIDE LIFT WHEEL CHAIRS

BACKGROUND OF THE INVENTION

This invention relates to lift wheel chairs that may be used to aid in the transfer of wheelchair-bound individuals to or from a bed, a car seat, a bath, etc. Wheelchairs typically have a frame combined with a seat, a back, enlarged rear wheels, and smaller front wheels. Typical prior art wheelchairs are configured in a collapsible design to allow convenient transportation of the wheelchair, for example, in the trunk of a vehicle. The prior art also includes various elevatable or lift-style wheelchairs as discussed herein.

The present invention is an improved wheelchair that provides a slidable and liftable seat to raise and transfer the wheelchair occupant from the chair to a position for safe and efficient egress to a bed, chair, etc. Unlike the use of a traditional wheelchair, which demands a greater degree of lifting and manipulation by nurses, aids, assistants, or orderlies to move an occupant from the chair, the wheelchair of the present invention allows for the convenient transport through manual or power assisted lifting to position the occupant more safely over or near the destination. By automating portions of the passenger transfer, the amount of lifting required of such assistants, and the risk of injury both to the occupant and the assistant, may be minimized.

U.S. Pat. No. 4,254,791 issued to Antonellis (the '791 patent) discloses an elevatable, side transfer wheelchair that comprises a seat having wheels thereunder and an elevatable base, having tracks thereon, which the wheels may engage. When in use as a wheelchair, the seat with wheels thereunder is locked in place with the wheels in the tracks. The chair is used in combination with a track placed on the seat of an automobile or other vehicle and the chair is operated by first adjusting the elevation of the seat to be coplanar with the tracks on the vehicle seat, unlocking the seat from the stand, and manually sliding the seat from the tracks on the chair base to the tracks on the vehicle. Elevation of the seat may be provided through an electric or pneumatic means.

U.S. Pat. No. 5,884,929 issued to Kincaid (the '929 patent) discloses a wheelchair having a base frame, a seat, and a transfer mechanism to laterally extend the seat from a first position over the frame to a loading or exit position located outwardly from the frame. The seat mechanism rests on a turntable type device to allow rotation of the seat to a convenient position for loading or exiting. The '929 patent does not disclose the vertical shifting, or elevating of the chair or seat, or a mechanism for accomplishing such motion.

U.S. Pat. No. 4,934,723 issued to Dysarz (the '723 patent) by contrast discloses only vertical shifting of the seat. The '723 patent is directed towards an elevating wheelchair that will allow a wheelchair bound individual to obtain a height similar to that of a standing person for conversing face-to-face. The mechanism of the '723 patent includes a leg means that supports the chair and raises the entire chair, including wheels, when the vertical lifting mechanism is activated.

U.S. Pat. No. 4,477,117 issued to Higgs (the '117 patent) discloses a foldable wheelchair having a raisable seat. However, the '117 patent does not disclose a laterally moveable seat or arms or back elements that might be easily folded out of the way to allow an individual to enter or leave the seat. The '117 is specifically directed towards a "safety" foldable wheelchair that would allow a wheelchair bound individual to conduct activities like cooking or other household chores from a safe height rather than at a seated position lower than the working surface.

U.S. Pat. No. 4,669,943 issued to Zamotin (the '943 patent) discloses a wheelchair for transferring an occupant to a motor vehicle. The chair of the '943 patent may be separated from the wheeled frame and left to rest on a vehicle seat. The configuration of the '943 chair includes a base unit having wheels thereon and a vertical side post which engages a side of the seat element. In this manner the configuration is similar to that used in automobile garages to lift or suspend engines, i.e. a side post supports a lifting mechanism and a stabilizing base extends outwardly therefrom.

U.S. Pat. No. 5,096,008 issued to Mankowski (the '008 patent) discloses a stand-up wheelchair. This wheelchair includes a seat that is rotatable and may be lifted from its rear to place the occupant in a standing position. Stability is maintained by locating power means over a central axle and having a second axle located beneath a foot rest. A central wheel is located beneath the interface of the portion that includes the power means and axle and the portion that includes the seat element. In this manner, the footprint of the chair comprises two triangles with a shared apex and the triangle comprised of the apex and the axle that runs beneath the foot rest is rotatable relative to the other triangle.

U.S. Pat. No. 5,209,322 issued to McMahon (the '322 patent) discloses an elevatable seat wheelchair but does not disclose a wheelchair capable of lateral movement to allow convenient entry or unloading of the chair by an occupant.

U.S. Pat. No. 5,060,960 issued to Branscumb (the '960 patent) discloses a combination wheelchair and lifting device wherein a seat is removable and the back rest may be removed or reclined to allow the occupant to recline or to allow access to the occupant's back while seated in the chair. The '960 patent does not disclose a laterally slideable seat.

U.S. Pat. No. 4,278,387 issued to Seguela (the '387 patent) discloses a device for transferring a wheelchair occupant from a vehicle to a wheelchair. The invention discloses a telescoping, laterally moveable seat, but does not disclose a vertically moveable seat. U.S. Pat. No. 5,613,697 issued to Johnson, the '697 patent, discloses merely an elevatable wheelchair. It does not disclose a wheelchair having any laterally moveable seat. U.S. Pat. No. 5,619,762 issued to Mein, the '762 patent discloses an apparatus for aiding a person to stand from a seated position.

Although the prior art discloses chairs adapted to raise a seated occupant, assist an occupant in moving from a seated to a standing position, and even chairs upon which a removable seat may be transferred to an aligned track, there remains, a need for an improved wheelchair that allows for simple lifting to the side of a wheelchair to accommodate the safe transfer of an occupant to a bed, chair, or other destination, from the wheelchair. Accordingly, it is an object of the present invention to provide a wheelchair that provides a power-assisted lifting and transfer function. It is a further object of the present invention to provide such a lifting and transfer function through a slide assembly that may be powered by an extension element to raise and laterally shift a seat from within a wheelchair frame to a position above and beside the frame. It is further still an object of the present invention to provide such a wheelchair wherein stabilizing means are employed to maintain the seat in stable position during occupant transfer and to provide an extendible stabilizer to accommodate the shifting of the center gravity of the occupant/wheelchair system.

SUMMARY OF THE INVENTION

The present invention is an improved wheelchair having a support frame, an extendable stabilizing arm and wheel, and a seat mounted on a slide assembly. The slide assembly may be raised upward and outward through the action of lift arms and an actuator. The lift arms and actuator are coupled at axles that allow the lift arms to pivot as they raise the slide assembly and seat. Through the use of the slide and lift arm assemblies, a traditional wheelchair design having enlarged rear wheels may be employed, and the slide is able to rise above and over the rear wheel. A foldable arm is provided which allows the seat and arm to serve as a bed-board or slide.

BRIEF DESCRIPTION OF THE DRAWING

FIG. 6 is a perspective view of the frame, stabilizer arm, and stabilizer arm housing;

FIG. 7 is a detailed perspective view of the stabilizer wheel assembly;

FIG. 8 is a detailed perspective view of the lift arms and actuator brackets;

DESCRIPTION OF THE PREFERRED EMBODIMENT OF THE INVENTION

Figure 2:
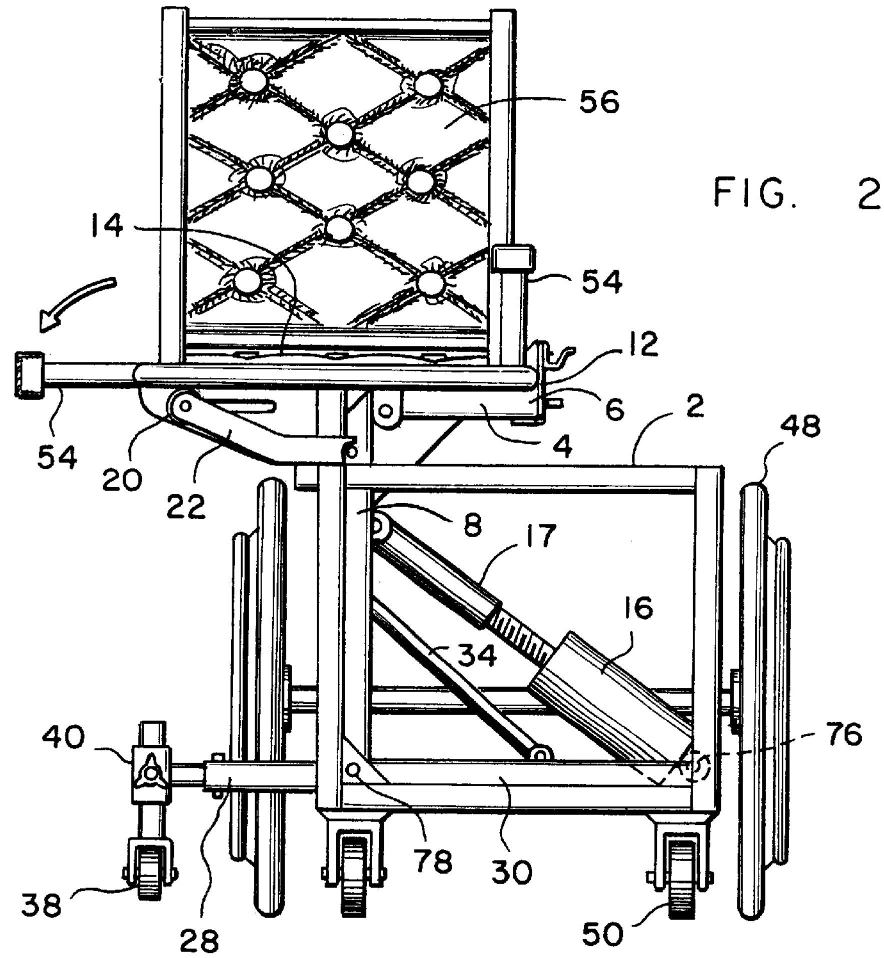
FIG. 2 is a front elevational view of the invention having the seat in a raised position.
Figure 1:
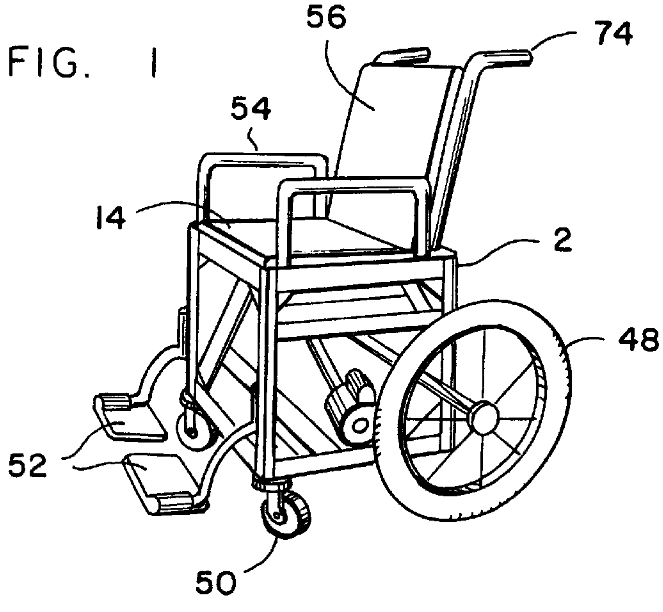
FIG. 1 is a perspective view of the invention having the seat in a lowered position.
Figure 3:
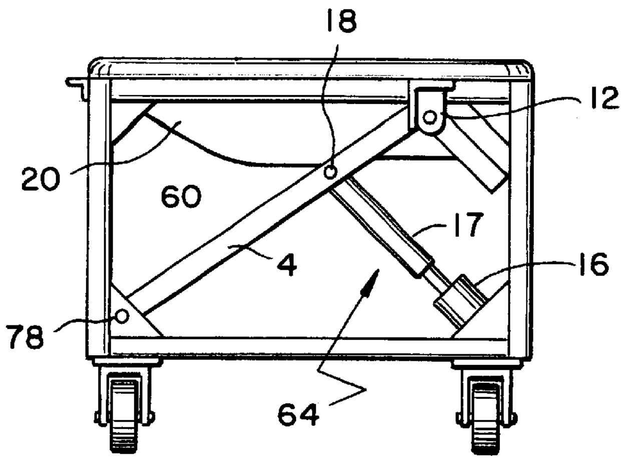
FIG. 3 is a detailed front elevational view of the invention showing the lifting arms and actuator assemblies.

FIGS. 1 and 2 disclose the preferred embodiment of the invention. A frame 2 rests upon a pair of enlarged rear wheels 48 and a pair of smaller front wheels 50. For automated wheelchairs, the enlarged rear wheels 48 (typically provided for manually powered motion) may be replaced with smaller wheels. Foot rests 52, as are known in the art, are provided at the front lower portion of the frame 2. The seat 14 and backrest 56, illustrated in a lowered position in FIG. 1, are shown in a raised and laterally shifted position in FIG. 2. The arms or seat sidewalls 54 may pivot downward about their bases to open and form a slide or "bed board" to facilitate the transfer of the occupant from the chair.

Figure 4:
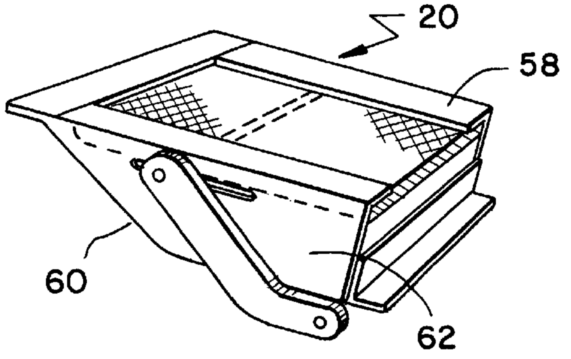
FIG. 4 is a detailed perspective view of the slide assembly.
Figure 5:
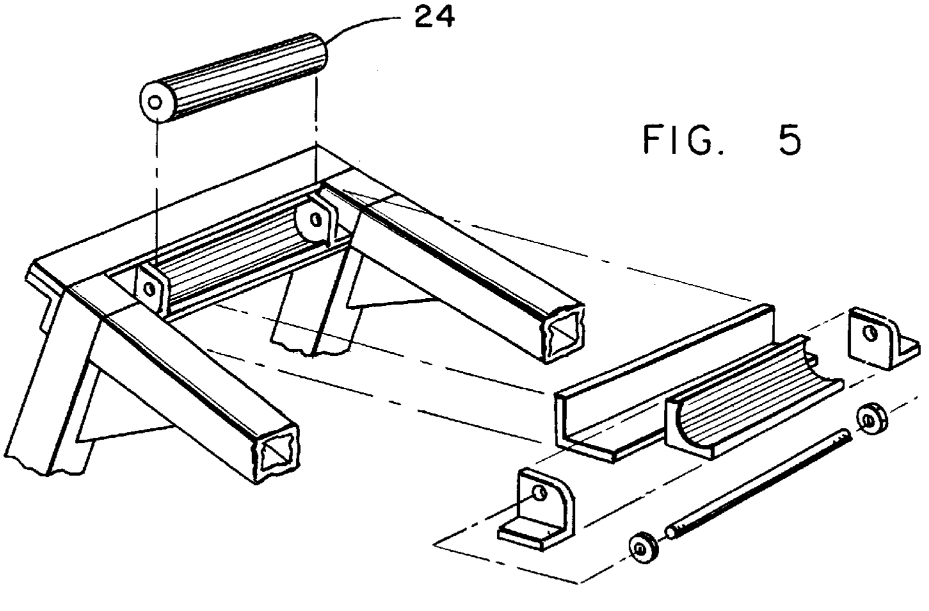
FIG. 5 is a detailed perspective view of a roller bar.

The seat 14 is supported upon a slide assembly 20 as further illustrated in FIG. 4. The slide assembly 20 rests upon an upper member of the frame 2, or preferably, a slide assembly roller 24, such as a generally cylindrical member mounted upon the frame 2 under the slide assembly 20 and under the path of motion that the slide assembly 20 follows when the lift is actuated as illustrated in FIG. 5. The slide assembly 20 comprises a generally "wedge-shaped" structure having a sloped bottom wall 60 that me be curved or linear, a seat supporting surface 58, and lateral supports such as slide assembly side walls 62 or a central wall, as necessary or appropriate depending upon the strength of the materials selected or depending on the configuration of any safety or cosmetic enclosures.

Figure 9:
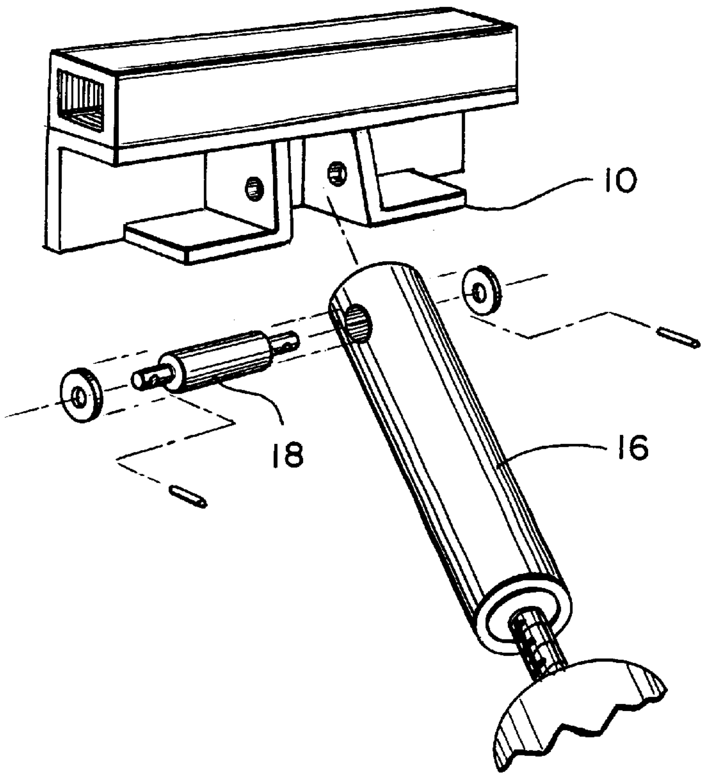
FIG. 9 is a detailed perspective view of the actuator bracket and actuator.

A lift arm and actuator assembly 64 connects the slide assembly 20 with the frame 2. The lift arm and actuator assembly 64 comprises an actuator 16, such as a hydraulically or electrically powered cylinder having one end pivotally affixed to the frame 2 and a second end affixed to an actuator pivot axle 18 as illustrated in FIG. 9. In the preferred embodiment, the actuator pivot axle 18 is attached to a lifting bracket between two lifting arms 4. Of course, the pivot axle 18 may be affixed to a suitable pivot anchor means in conjunction with one or more arms, depending upon the anticipated loads and material selection. The actuator 16 may be a drive mechanism that may push or pull an extension element such as a cylinder, rod 17, or it may be a combined drive and extension unit. Because of the vertical load that is transferred through the actuator extension element of the preferred embodiment, torque resistance is important for durability and a worm-type drive is the preferred extension means. The lift bracket 10 and dual lift arms 4 of the presently preferred embodiment are illustrated in FIGS. 8 and 9, respectively. The actuator may be an electric motor adapted to operate from an AC or a DC source, or it may be a pressurized fluid drive such as a pneumatic or hydraulic pump or pressure source. If economy dictates, the actuator may be a manual drive such as a crank or ratchet system.

Each lift arm 4 comprises a generally "L-shaped" member having an elongated section 8 with a shortened section 6 normal thereto. Of course, depending on the size of the chair and the anticipated load created by an occupant, the relative lengths of the lift arm 4 sections may vary. The elongated section 8 of the lift arm 4 is attached at its lower end to the frame by a lift arm lower axle 78 which may pivot. The lift arm 4 is attached to a seat axle 12 generally at the point of connection between the elongated and the shortened sections of the lift arms 4, as illustrated in FIG. 1. Again, depending on the load, the number of lift arms 4 and the number or type of actuator 16 and/or extension elements 17 may vary.

When the seat is fully raised and laterally shifted, the shortened sections 6 of the lift arms 4 are generally parallel with and underneath the seat 14. This provides additional vertical support to the raised seat and aids to stabilize the seat 14 against the shifting of an occupant in the raised seat. If this additional support is not required the lift arm or arms may simply comprise the elongated section. Slide assembly arms 22 are pivotally connected to the lift arms 4 and slidingly connected to the slide assembly 20. The slide assembly arms 22 may include a roller that glides under a front lip of the seat 14 or the slide assembly 20. In the preferred embodiment a lip on the underside of the seat supporting surface 58 of the slide assembly 20 contacts the roller, and a slot in the slide assembly sidewalls 62 receives an axle which connects the slide assembly arms 22. As an alternative, the present invention may be practiced without a lift arm, relying instead upon a floating or hanging bracket means to combine the extension element 17 with the slide assembly 20 and, if desired, the stabilizing arm 28. The preferred embodiment employs a lift arm 4 to ensure added stability to the seat 14 and to the slide assembly 20, and to reduce the load that the extension means must bear.

Figure 10:
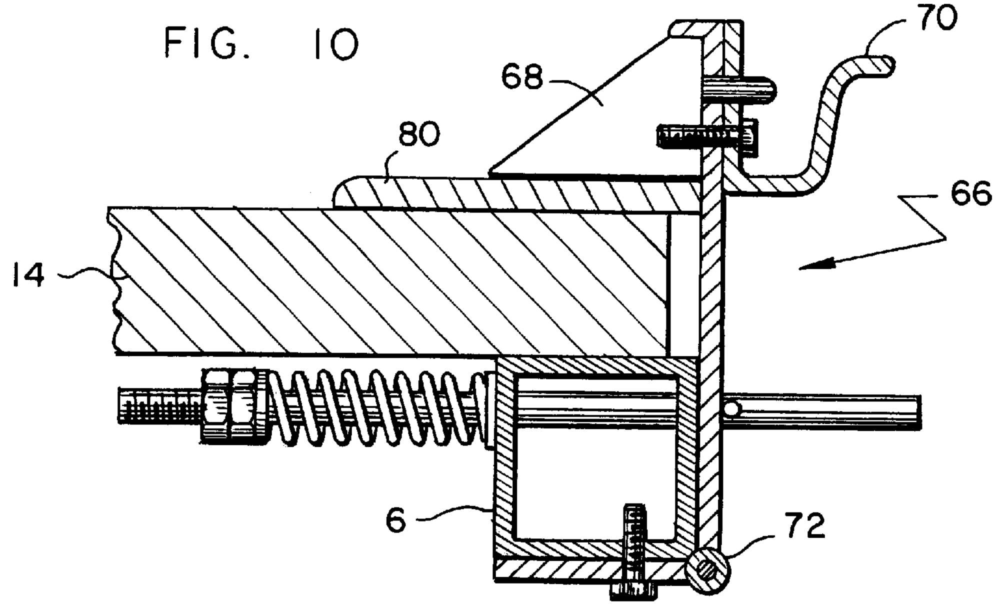
FIG. 10 is a detailed elevational view of the seat locking assembly.

A locking wedge assembly 66, as illustrated in FIG. 10, or other locking means, is used to secure the seat 14 in the raised and shifted position. The locking means may comprise a deadbolt mechanism a solenoid, limit switch, or other convenient means to mechanically secure the seat in a raised position or to prevent actuation of the lift mechanism while engaged. The simple and preferred locking wedge assembly 66 comprises a locking wedge 68 that may be rotated through the use of a lock release arm 70 cause the wedge 68 or wedge support to rotate about a pivot point 72 to cause the wedge 68 to engage a top surface of the seat 14, or a plate 80 upon the seat, and hold the seat against the shortened section of the lift arm 4. Because the lift arm 4 and seat are moved apart through the angular motion of the lift arm 4 during the lowering of the seat 14, the simple seat locking wedge assembly safely maintains the raised position. In the preferred embodiment, a limit switch or other safety means coupled with the actuator or power means is employed in combination with the wedge assembly to ensure that the locking wedge is released prior to lowering of the seat by the actuator.

A stabilization assembly 26 is used to ensure that the wheelchair maintains stability as the center of gravity shifts during lifting. A stabilizer arm housing 30 is attached to the frame 2 and a stabilizer arm 28 may be telescopically extended from the housing 30 to provide a point of support exterior to the frame 2. A stabilizer wheel assembly 32 is connected to the stabilizer arm 28. The stabilizer wheel assembly 32 preferably comprises a height adjuster 40 and a wheel 38. The wheel 38 may be mounted upon a rotational mount to allow a smooth rolling motion in concert with the direction of motion of the chair and also to allow a smooth rolling motion in the direction of stabilizer arm 28 extension. A caster may be used to achieve a similar effect. Alternatively, the wheel may be mounted to allow simple bi-directional motion. In such a case, the height adjuster 40 is preferably used to raise the wheel so that the wheel only engages the ground when the stabilizer arm 28 is extended and the shifting center of gravity of the wheel/occupant system forces the stabilizing arm and wheel downward.

The stabilizer arm 28 is extended through actuation of the actuator 16. The lift arm 4 or actuator 16 or extension element 17 is connected to the stabilizer arm 28 by a stabilizer connector rod 34 (illustrated in FIG. 2) that extends through a slot 32 in the stabilizer arm housing 34 and is attached to the stabilizer arm 28 and the lift arm 4. Extension of the by the actuator 16 forces the lift arm 4 to rotate upward, which causes the stabilizer arm 28 to be pulled outward through its housing 30 by the connector rod 34. Through this preferred combination and arrangement of elements, the single actuator 16 may cause rotation of the lift arms 4 which force the extension of the stabilizer arm 28 and the raising of the slide assembly 20 and seat 14.

To facilitate the transfer of an occupant, the wheelchair of the present invention may be positioned alongside the destination bed, chair, etc. Wheel locks may be engaged to prevent movement of the chair. Actuation of the actuator 16 causes the extension element 17 to force the lift arm 4 from a its resting position to a generally vertical position. As the lift arm 4 pivots about the lift arm lower axle 78, the slide assembly 20 is forced over the roller 24, upward and to the side. The lift arm shortened section 6 moves from its angled position to its raised position generally parallel with and underneath the seat 14 or the seat support surface 58. The seat 14 and slide assembly 20 are therefore supported by the roller 24 the shortened section 6 and the slide assembly lifting arm 22 in the preferred embodiment. The slide assembly lifting arm 22 may also prevent the outside edge of the seat 14 from rising as the axle through the slot may serve to hold the seat in the required plane. As the lift arm 4 moves, the stabilizer arm 28 is forced through its housing 30 and the stabilizing wheel assembly 36 moves outwardly in concert with the slide assembly 20. When raised, a locking means such as 66 may be engaged to prevent accidental retraction of the seat during transfer. The appropriate arm 54 may be pivoted about its base or removed to create a slide or bed board, or to clear a path for occupant transfer. Other stabilization means may be employed including anchoring, strapping, or hooking systems to secure the wheelchair against an object such as a bed, rail, or other secure base or occupant destination. In addition the stabilizing system of the preferred embodiment may be adapted to include a foot or base element rather than a wheel, or a stabilizing arm may be positioned to manually extend or rotate from the wheelchair to a position of stabilizing contact with the floor or another surface.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A lift wheelchair for raising an occupant from a seat resting position to a transfer position above and outside a frame, said wheelchair comprising:

a frame having an opening formed therein;

a lift arm pivotally connected with the frame;

a slide assembly being pivotally combined with the lift arm, said slide assembly comprising a sloped bottom wall, an upper wall, and a connecting wall therebetween, said slide assembly being adapted to be moved between a lowered position within the frame opening and a transfer position, an extension element being pivotally combined with the frame and being pivotally combined with the lift arm, said extension element being adapted to force the lift arm to rotate about its pivotal connection with the frame;

an actuator for retractably extending the extension element;

a stabilizer adapted to support the wheelchair to resist tipping.

2. The wheelchair of claim 1 further comprising:

a slide assembly lift arm having a first end combined with the slide assembly, and a second end pivotally combined with the lift arm.

3. The wheelchair of claim 2 further comprising:

a slide assembly lift arm wheel connected to the slide assembly lift arm first end, said slide assembly lift arm wheel engaging the slide assembly upper wall.

4. The wheelchair of claim 1 wherein:

the stabilizer comprises a stabilizer arm housing connected to the frame, a stabilizer arm housed in said housing and having a first end that extends therefrom, and a wheel assembly combined with said stabilizer arm first end.

5. The wheelchair of claim 4 wherein:

the wheel assembly comprises a height adjustable wheel.

6. The wheelchair of claim 1 further comprising:

a seat positioned over the slide assembly bottom wall; and a movable wall located beside the seat and being adapted to serve as an armrest when in a generally vertical position, and said moveable wall being adapted to serve as a transfer surface when moved from the generally vertical position.

7. The wheelchair of claim 1 wherein:

the actuator is an electric motor.

8. The wheelchair of claim 1 wherein:

the extension element is a hydraulic cylinder.

9. The wheelchair of claim 1 wherein:

the extension element is a worm drive.

10. The wheelchair of claim 1 wherein:

the actuator is manually powered.

11. The wheelchair of claim 1 wherein:

the slide assembly bottom wall is adapted to slide over and be supported by a frame top surface when the lift arm moves the slide assembly between the lowered position and the transfer position.

12. The wheelchair of claim 1 further comprising:

a roller combined with the frame and located beneath the slide assembly bottom wall, said slide assembly bottom wall being moveable over said roller.

13. The wheelchair of claim 1 further comprising:

a second lift arm pivotally combined with the frame positioned generally parallel to the lift arm, an actuator pivot axle connected to the lift arm and to the second lift arm, said actuator pivot axle pivotally engaging a top end of the extension element.

14. The wheelchair of claim 12 further comprising:

a bracket connecting the lift arm and the second lift arm and the actuator pivot axle.

15. The invention of claim 1 wherein:

the lift arm comprises an elongated section and a shortened section, said elongated section being pivotally combined with the frame and said shortened section being adapted to support the slide assembly upper wall when the slide assembly is in the transfer position.

16. The invention of claim 1 further comprising:

a transfer position lock combined with the lift arm and adapted to prevent movement of the slide assembly from the transfer position to the lowered position.

17. The invention of claim 16 wherein the lock comprises:

a clamp connected to the lift arm shortened section, said clamp being moveable into a locked position over the slide assembly upper wall.

18. The invention of claim 16 wherein the lock comprises:

a clamp connected to the lift arm shortened section, said clamp being moveable into a locked position over the seat.

19. The invention of claim 16 wherein the lock comprises:

a seat plate positioned over the seat;

a clamp connected to the lift arm shortened section, said clamp being movable into a locked position over the seat plate.

20. A wheelchair comprising:

a frame having an opening formed therein;

an extension element being pivotally mounted within said frame;

a slide assembly comprising a sloped bottom wall, an upper wall and a connecting wall therebetween, said slide assembly being pivotally combined with said extension element and said slide assembly being moveable between a resting position within said opening and a transfer position, said slide assembly being adapted to place the bottom wall over a top surface of the frame when the slide assembly is moving between the resting and transfer positions.

* * * * *